(12) United States Patent
Hansen

(10) Patent No.: US 10,874,988 B2
(45) Date of Patent: Dec. 29, 2020

(54) DEVICE FOR PURIFYING LIQUIDS BY DISTILLATION

(71) Applicant: HSL Energy Holding ApS, Ishøj (DK)

(72) Inventor: Niels Hansen, Svendborg (DK)

(73) Assignee: HSL Energy Holding Aps, Ishoj (DK)

( * ) Notice: Subject to any disclaimer, the term of this patent is extended or adjusted under 35 U.S.C. 154(b) by 0 days.

(21) Appl. No.: 16/302,790

(22) PCT Filed: May 23, 2017

(86) PCT No.: PCT/DK2017/050168
§ 371 (c)(1),
(2) Date: Nov. 19, 2018

(87) PCT Pub. No.: WO2017/202431
PCT Pub. Date: Nov. 30, 2017

(65) Prior Publication Data
US 2019/0176051 A1    Jun. 13, 2019

(30) Foreign Application Priority Data

May 23, 2016  (DK) .................................. 2016 70344
May 24, 2016  (DK) .................................. 2016 70349

(51) Int. Cl.
*B01D 61/36*    (2006.01)
*B01D 3/06*    (2006.01)
(Continued)

(52) U.S. Cl.
CPC ............ *B01D 61/364* (2013.01); *B01D 1/26* (2013.01); *B01D 3/065* (2013.01); *B01D 3/146* (2013.01);
(Continued)

(58) Field of Classification Search
CPC .......... B01D 1/26; B01D 3/065; B01D 3/146; B01D 61/364; B01D 5/006; C02F 1/14; C02F 2103/08; Y02A 20/212
See application file for complete search history.

(56) References Cited

U.S. PATENT DOCUMENTS

| | | |
|---|---|---|
| 781,045 A | 1/1905 | Brooke-Sewell |
| 3,251,397 A * | 5/1966 | Lens ........................ B01D 1/26 159/17.4 |

(Continued)

FOREIGN PATENT DOCUMENTS

| | | |
|---|---|---|
| EP | 0039197 A1 | 11/1981 |
| EP | 1925355 A1 | 5/2008 |

(Continued)

OTHER PUBLICATIONS

WO2005075045A1_Eng (WIPO machine translation of Vinz) (Year: 2005).*

(Continued)

*Primary Examiner* — Jonathan Miller
*Assistant Examiner* — Gabriel E Gitman
(74) *Attorney, Agent, or Firm* — Ziegler IP Law Group, LLC

(57) ABSTRACT

A device for purifying liquids by distillation includes a first and a second evaporation section, and a first and a second condensation section, where each evaporation section includes a liquid inlet and a vapor outlet and each condensation section includes a vapor inlet and a liquid outlet, the first evaporation section and the second condensation section being in vapor connection through the first evaporation section outlet and the second condensation section inlet, wherein the first evaporation section is in thermal contact with the first condensation section, and the second evaporation section is in thermal contact with the second condensation section, wherein the sections in thermal contact are (Continued)

Figure 1:
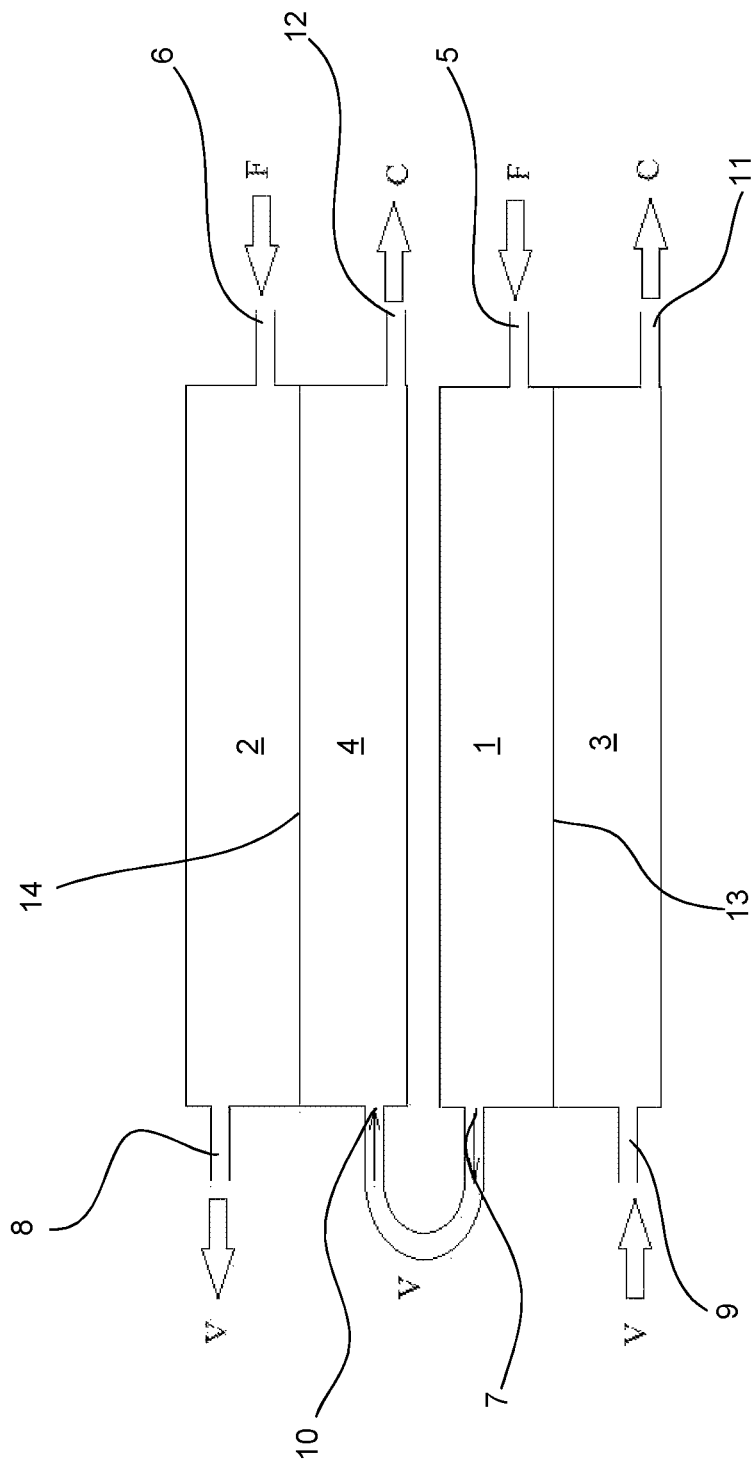

separated by a non-permeable polymer membrane. The device is compact and efficient in the production of a distillate product.

19 Claims, 8 Drawing Sheets

(51) Int. Cl.
  *B01D 1/26* (2006.01)
  *C02F 1/14* (2006.01)
  *B01D 3/14* (2006.01)
  *B01D 5/00* (2006.01)
  *C02F 103/08* (2006.01)

(52) U.S. Cl.
  CPC .............. *B01D 5/006* (2013.01); *C02F 1/14* (2013.01); *C02F 2103/08* (2013.01); *Y02A 20/212* (2018.01)

(56) References Cited

U.S. PATENT DOCUMENTS

| | | | |
|---|---|---|---|
| 3,305,454 A * | 2/1967 | Cowley | C02F 1/04 202/205 |
| 3,497,423 A | 2/1970 | Rodgers | |
| 3,661,721 A | 5/1972 | Rodgers | |
| 3,822,192 A * | 7/1974 | Brown | B01D 1/22 203/49 |
| 4,329,204 A | 5/1982 | Petrek et al. | |
| 4,329,205 A | 5/1982 | Tsumura et al. | |
| 4,402,793 A | 9/1983 | Petrek et al. | |
| 5,062,927 A * | 11/1991 | Stout | B01D 1/16 203/89 |
| 2004/0026225 A1 | 2/2004 | Domen | |
| 2010/0307910 A1* | 12/2010 | Engelhart | B01D 1/0035 203/21 |
| 2012/0118722 A1* | 5/2012 | Holtzapple | F28F 9/0219 203/11 |

FOREIGN PATENT DOCUMENTS

| | | | |
|---|---|---|---|
| FR | 2321920 A1 | 3/1977 | |
| GB | 1105960 | 3/1968 | |
| WO | 01/00533 A1 | 1/2001 | |
| WO | WO2005075045 A1 * | 8/2005 | ............... B01D 1/16 |

OTHER PUBLICATIONS

International Search Report, Application No. PCT/DK2017/050168, dated Jul. 19, 2017, 2 pages.
First Office Action issued with Search Report for Danish Patent Application No. PA201670344, dated Dec. 23, 2016, 8 pages.
International Preliminary Report on Patentability and Written Opinion received for International Patent Application No. PCT/DK2017/050168, dated Nov. 27, 208, 08 pages.

* cited by examiner

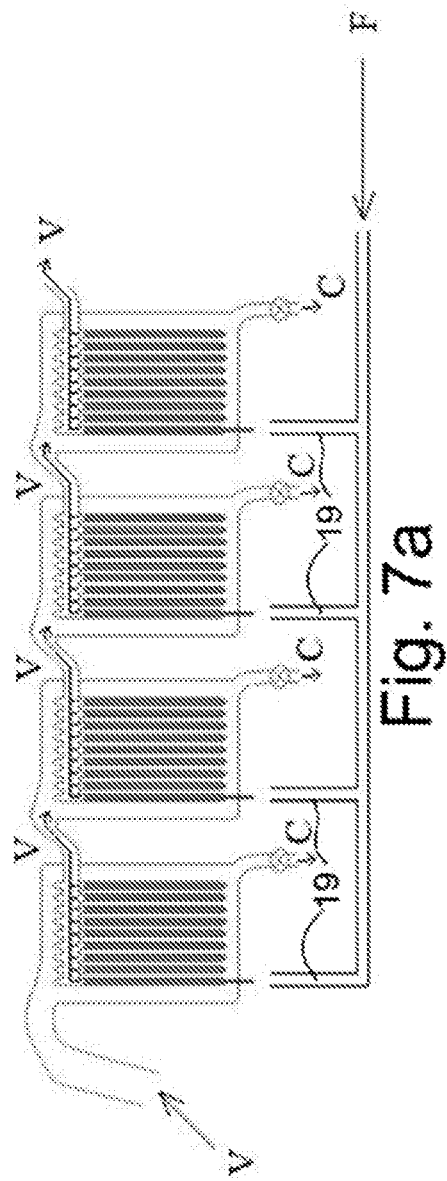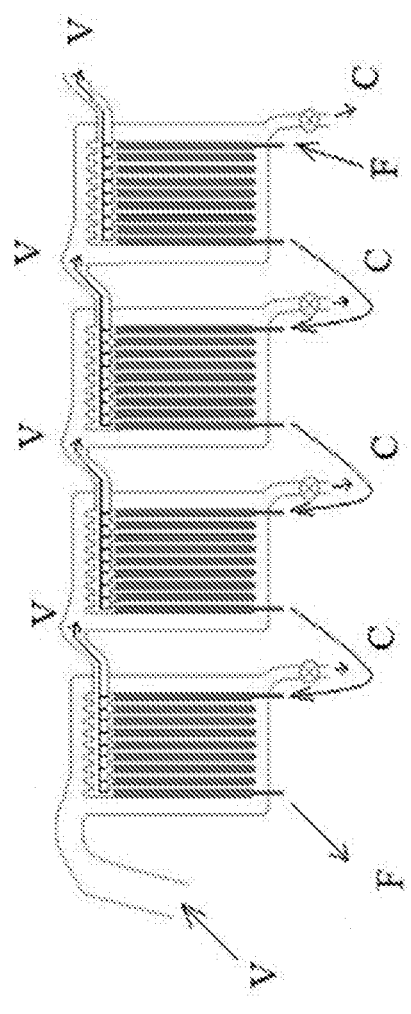

DEVICE FOR PURIFYING LIQUIDS BY DISTILLATION

INTRODUCTION

The aspects of the disclosed embodiments relate to a device and a method for purifying liquids by distillation. The embodiments may be used in the field of producing drinking water from saline sea water. However, also other feed liquids may be used, such as ethanol containing liquids obtained by fermentation of yeast, for the production of alcoholic beverages or other products comprising ethanol.

BACKGROUND ART

Distillation is a well known process for purifying liquids and separating components in a liquid from one another, by selective evaporation and condensation.

Some related developments on the general distillation method are known as "Multiple-effect distillation" (MED) and "Multi-stage flash distillation" (MSF). Both MED and MSF are often used for desalination of water, to create drinking water. In Multiple-effect distillation, the distillation occurs in multiple stages. In each stage heat is applied to feed water. This will evaporate some of the feed water, and create vapor, thus energy has been transferred from the heat element to the vapor. This vapor is transported to the next step where it is condensed, when releasing energy to the feed water of the next stage, heating and evaporating more water. Each stage essentially reuses the energy from the previous stage. Different developments on MED and MSF can be found in the prior art.

One example is described in U.S. Pat. No. 4,402,793, which discloses a multiple effect diffusion distillation system, including a plurality of parallel metal plates for continuous recovery of heat having opposed evaporation and evaporation phases. Gravity is used for flowing a liquid film in the evaporation compartment with vapor condensing on the other side of the metal plate. The metal plates provides for a heavy and expensive construction. U.S. Pat. No. 4,329,204 also discloses a multiple effect distillation system, having a plurality of parallel plates with an alternative construction.

US 2004/0026225 pertains to appliances with evaporation and condensation compartments separated by a flexible sheet molded plastic. The sheet is made from a thin membrane of e.g. polyethylene, which is folded in two, with a hydrophilic coating on the outside, then subjected to one or more welding processes to as to form a large number of parallel longitudinal weld seems. The formed channels are slightly inflated during operation with a non-condensable gas.

U.S. Pat. No. 4,329,205 discloses an apparatus for distilling water, comprising heat receiving plates between an evaporation compartment and a condensation compartment, the heat receiving plates comprising a porous backing capable of absorbing condensed water.

While multi-effect distillation processes have been described in the prior art, there is still room for improvement as to the bulkiness and efficiency. The present invention suggests a compact device, which in an efficient way can produce a distillate product. Furthermore, the device may be produced in relative cheap materials, such as polymers, and easily assembled.

SUMMARY

The aspects of the disclosed embodiments related to a device for purifying liquids by distillation, the device comprising a first and a second evaporation section, and a first and a second condensation section, each evaporation sections comprising a liquid inlet and a vapor outlet and each condensation sections comprising a vapor inlet and a liquid outlet, the first evaporation section and the second condensation section being in vapor connection through the first evaporation section outlet and the second condensation section inlet, wherein the first evaporation section is in thermal contact with the first condensation section, and the second evaporation section is in thermal contact with the second condensation section, wherein the sections in thermal contact are separated by a non-permeable membrane.

The embodiments disclosed herein provide a simple and inexpensive multiple effect distillation system. The non-permeable membrane may be produced of any suitable material, which can withstand the heat and pressure provided in the respective sections. In the present application and claims, the term non-permeable means that substantial amounts of vapor does not penetrate the membrane. As an example, less than 10 g vapor per $m^2$ membrane is allowed to penetrate the membrane per hour. In a certain embodiment, the non-permeable membrane is prepared of a polymer. Examples of polymer materials include polyethylene (PE), polypropylene (PP), polyethylene terephthalate (PETP), polyvinylchloride (PVC), polyesters, polystyrene (PS), polyacrylonitrile, polytetrafluoroethylene, poly (methyl methacrylate), poly(vinyl acetate). The polymer is suitably a single sheet of polymer having a thickness of 1 mm or less, such as 0.5 mm, 0.3 mm, 0.1 mm or less. In other embodiments, the non-permeable membrane is prepared of a metal or metal alloy, such as aluminum or stainless steel. To decrease the heat loss in the membrane a thin membrane that nevertheless is able to withstand the mechanical and thermal stress is generally preferred. The polymer sheet may be covered by a polymer material with polarity that matches the polarity of the feed. Thus, when an aqueous feed is used the polymer membrane may be provided with a hydrophilic surface to enhance the compatibility.

It is generally suitable that the non-permeable polymer membrane is supported by supporting members, especially when the polymer is pliable or stretchable. The supporting members may be designed to bend the polymer membrane in a desired shape and to secure the membrane in place.

Usually, the non-permeable polymer membrane is provided in a shape, the shape providing a surface area of the membrane being at least twice the size of a non-bend plane membrane. The bending of the membrane ensures a larger area of contact between the condensation zone and the evaporation zone, thus increasing the efficiency. A preferred shape of the polymer membrane is a wave-like structure, without sharp edges.

In a certain embodiment of the present disclosure the second evaporation section comprise a liquid outlet, which is in fluid communication with the inlet of the first evaporation section. In this way, the feed liquid is recirculated to a preceding evaporation section. The recirculation will maintain the heat energy to a subsequent step but also increase the concentration of any impurities in the feed liquid. If it is acceptable to increase the concentration of the impurities, the counter-current arrangement of vapor/condensation and feed liquid increases the efficiency of the system.

In a preferred embodiment, a face of the first evaporation section and a face of the second condensation section are separated by a thermally isolating element or air. If the evaporation section is placed in thermal contact with the condensation section, the risk is that the vapor will begin condensing in the evaporation section. A thermally isolating element or just air, which in this context is also considered a thermally isolating element, arranged between a face of the evaporation section and a face of the condensation section will also increase the efficiency of the system. In other embodiments of the invention it is desired that a heat transfer occurs with high efficiency to ensure a high energy efficiency.

To obtain easy assembly of a module at least a part of the first and second evaporation section is complementary to at least a part of the first and second condensation section, respectively. The complementary parts of the evaporation and condensation sections are interfaced by the membrane in the final module and in this way, the membrane is fixed between the sections. While the mechanical pressure may be sufficient for attaching the membrane to the sections it may be advantageously to used attachment means, like glue, to securely attachment of the membrane to the sections and the supporting elements, if present.

In general, the vapor inlet of the first condensation section is adapted to receive a feed vapor. The feed vapor may be provided from any source, including a traditional boiler. In a certain aspect, the feed vapor is generated by heating of panels with the sun light, thereby evaporating the liquid to produce a vapor. As the first condensation section provides a suction effect due to the condensing of vapor, the pressure of the vapor may be below the ambient pressure. In a preferred aspect, the first condensing section does not comprise a vapor outlet, i.e. the entire amount of vapor entering the first condensation section will condense to provide the desired suction effect.

To enhance the contact surface area the membrane may have any form or shape. In a certain embodiment, the shape of the non-permeable membrane defines one or more elongated grooves. The elongated grooves serve the purpose of transporting the liquid towards an outlet. In a preferred aspect two or more grooves in an evaporation section are liquidly connected to each other to establish a flow system between grooves. Thus, the flow system establishes a distribution of the liquid in the evaporation section from the inlet to the outlet. Usually, the grooves are distributed uniformly in the evaporation section to obtain an equal treatment of the liquid. In a preferred aspect of the invention a plurality of grooves is fluidly connected to provide for a flow system of feed liquid from the inlet to the outlet of an evaporation section.

The grooves may be connected in parallel or serial in each section. Thus, in a certain embodiment of the invention the feed liquid is supplied to the end of two or more grooves through a manifold to provide for a parallel flow of the feed liquid. A parallel flow is usually more efficient due to less flow resistance. However, it may be an advantage in some embodiments to connect each groove in a section in series, e.g. for reducing the complexity of the device.

While the vapor outlet of an evaporation section and the vapor inlet of a condensation section may be connected through a hose it may in some embodiments be suitable to combine the vapor outlet of an evaporation section and the vapor inlet of a condensation section into an opening allowing vapor to migrate from the evaporation section to the condensation section. The combined vapor outlet of an evaporation section and the vapor inlet of a condensation section into an opening allows for internal vapor connection between sections without the need for a hose. The opening may be designed as a single hole, a plurality of holes or an elongated channel allowing the vapor to migrate from the evaporation section to the condensation section.

In an embodiment of the invention, two or more grooves in a condensation section are liquidly connected to each other to establish a flow system between grooves. The flow system will allow for the withdrawal of the condensate from a few or even a single outlet.

In another embodiment, an outlet of condensate from a first condensation section is liquidly connected to an inlet to the flow system of a second condensation section. The circulation of the condensate to a subsequent condensation section allows for improved conservation of heat energy.

The feed liquid may be obtained from various sources. In one aspect of the invention, the feed liquid is saline sea water for the production of distilled water. In another aspect, the feed liquid contains organic solvents like ethanol for obtaining a distillate product with a concentration of organic solvent which is higher than in the feed liquid. The materials for the device, especially the membrane, are suitably selected in due regard to the feed liquid to avoid substantial exchange of components over the membrane. The treat feed liquid may be discharged or any impurities that have been up concentrated may be recovered. When saline is produced at the outlet it may For practical applications of the present invention, an evaporation section and a condensation section constitutes a module, the evaporation section comprising a liquid inlet and a vapor outlet, and the condensation section comprising vapor inlet and liquid outlet. At least two modules are connected to obtain the invention. To obtain the possibility of transferring the feed liquid to a subsequent module, the evaporation section of the module may further comprise a feed liquid outlet.

The modules are connected, so that the vapor outlet of an evaporation section is connected to an inlet of a condensing section in a subsequent module. In certain embodiments, the vapor outlet of an evaporation section and the inlet of a subsequent condensing section are combined in an opening, that allow vapor to migrate from an evaporation section to a subsequent condensation section. In this way, vapor may be transported between sections with low or no loss of energy and risk of condensation in connecting hoses or tubes.

In a preferred aspect, to allow counter-current operation, a liquid outlet of the evaporation section is also connected to a liquid inlet of an evaporation section in a preceding module. The distillate product obtained at the outlet of the condensation sections may be pooled together optionally after suitable heat exchange with any liquid or vapor stream in the system. If necessary, the distillate product streams are cooled individually or after pooling.

In a specific embodiment, the number of modules is three or more and the initial module is adapted for receiving a feed vapor through the condensation section inlet. Furthermore, a terminal module may be adapted for receiving feed liquid through the evaporation section inlet, thus providing for a feed liquid in counter-flow with the feed vapor.

Suitably, the number of modules is 4 or above, such as 5, 6, 7, 8, 9, 10, 11, 12 or above. After the device has been operated for a certain time fouling and precipitate may occur especially in the evaporation sections. Therefore, a suitable cleaning may be performed. The cleaning may involve back flushing with a suitable liquid such as the feed liquid or the distillate product. Alternatively, or in addition the cleaning may involve suitable chemicals that can react and dissolve the fouling or precipitation.

The aspects of the disclosed embodiments also relate to a method of producing a distillate product from a feed liquid, by use of a device described above, the method comprising the steps of:

a) Supplying a feed liquid through a liquid inlet of the first and second evaporation section,
b) Applying a vapor to the first condensation section through the vapor inlet to evaporate the feed liquid of the first evaporation section in step a), and condensate the vapor in the first condensation section, to produce a distillate product in the first condensation section, and a vapor in the first evaporation section,
c) Transferring the vapor obtained in step b) through the first evaporation section vapor outlet to the second condensation section vapor inlet,
d) Allowing condensation of the transferred vapor in the second condensation section to produce a distillate product, and evaporation of the feed liquid provided in the second evaporation section in step a),
e) Draining the distillate product from the first condensation section and the second condensation section through the respective outlets.

In a certain embodiment of the present disclosure, the liquid inlet of the first evaporation section of step a) is in liquid communication with the liquid in the second evaporation section to allow conservation of energy in a subsequent step.

In a certain embodiment of the present disclosure the first evaporation section vapor outlet and the second condensation section vapor inlet of step c) are combined into an opening, which will allow vapor to migrate with low or no loss of energy between sections.

Usually, the temperature of the vapor applied to the first condensation section in step b) is higher than the temperature of the vapor produced in the first evaporation section. Thus, in the last evaporation step the temperature of the vapor is significantly lower than the vapor of the first condensation section. In a certain embodiment, the temperature of the last step is 10° C. or more, such as 20° C., 30° C., 40° C., 50° C. or more than the vapor supplied to the first condensation section.

In an embodiment, the temperature difference between the vapor applied to the first condensation and the vapor produced in the first evaporation section is 1° C. or more, such as 2° C., 3° C., 4° C., or more.

In an embodiment, the temperature difference between the vapor applied to the first condensation and the vapor produced in the first evaporation section is 20° C. or less, such as 15° C., 12° C., 10° C., 8° C. or less.

The feed liquid entering an evaporation section may preheated by heat exchange with spent feed liquid evaporated one or more times to capture the heat energy in the brine.

To obtain a multiple effect distillation with three or more steps the method further comprises a third or more condensation sections and a third or more evaporation sections, wherein feed liquid is supplied through a liquid inlet of the third or subsequent evaporation section, vapor is supplied to the third or subsequent condensation section through the vapor inlet from the preceding evaporation section, and the distilled product is drained from the third or subsequent condensation section outlet.

SHORT DESCRIPTION OF THE DRAWINGS

Figure 2:
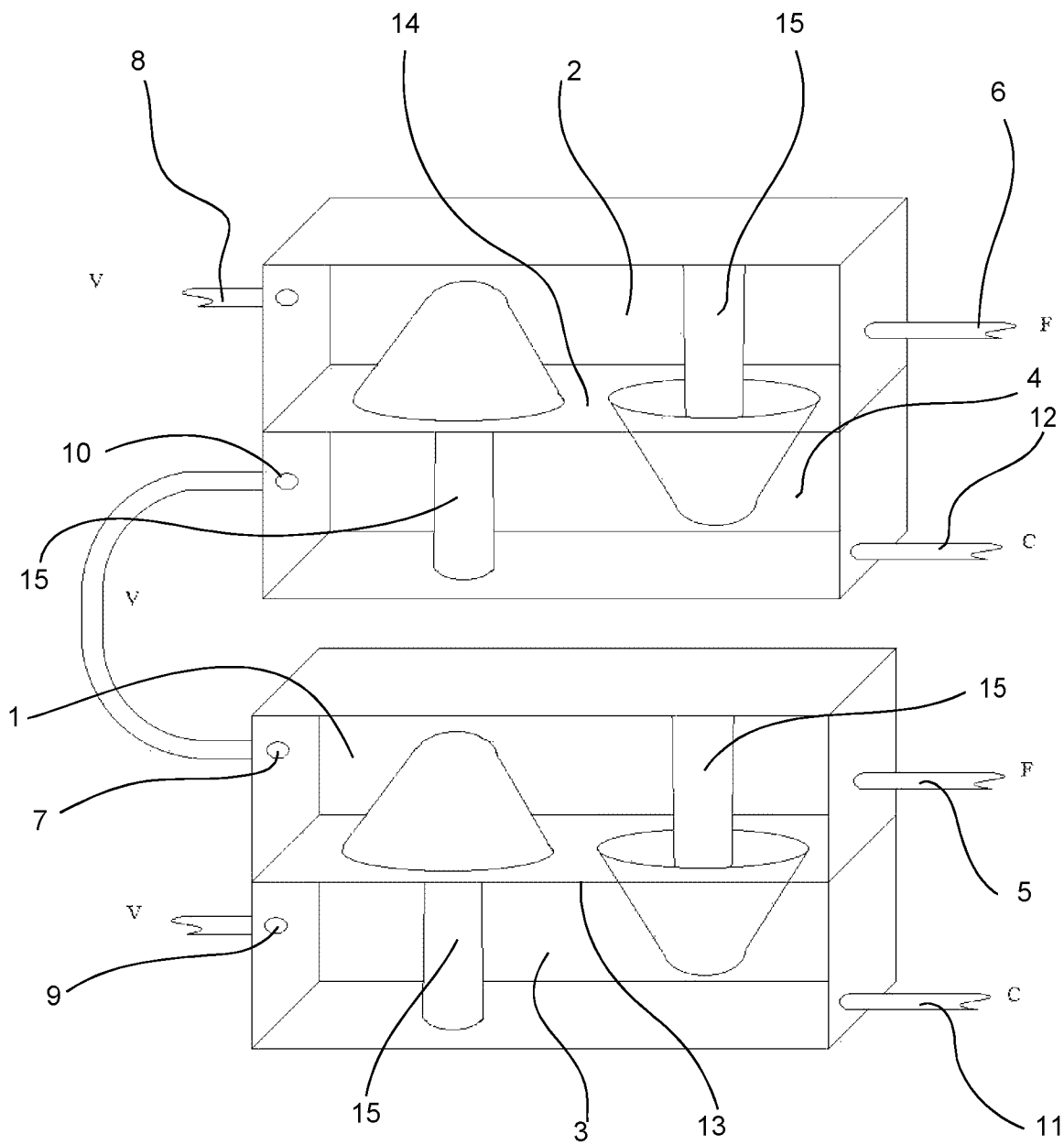
Figure 3:
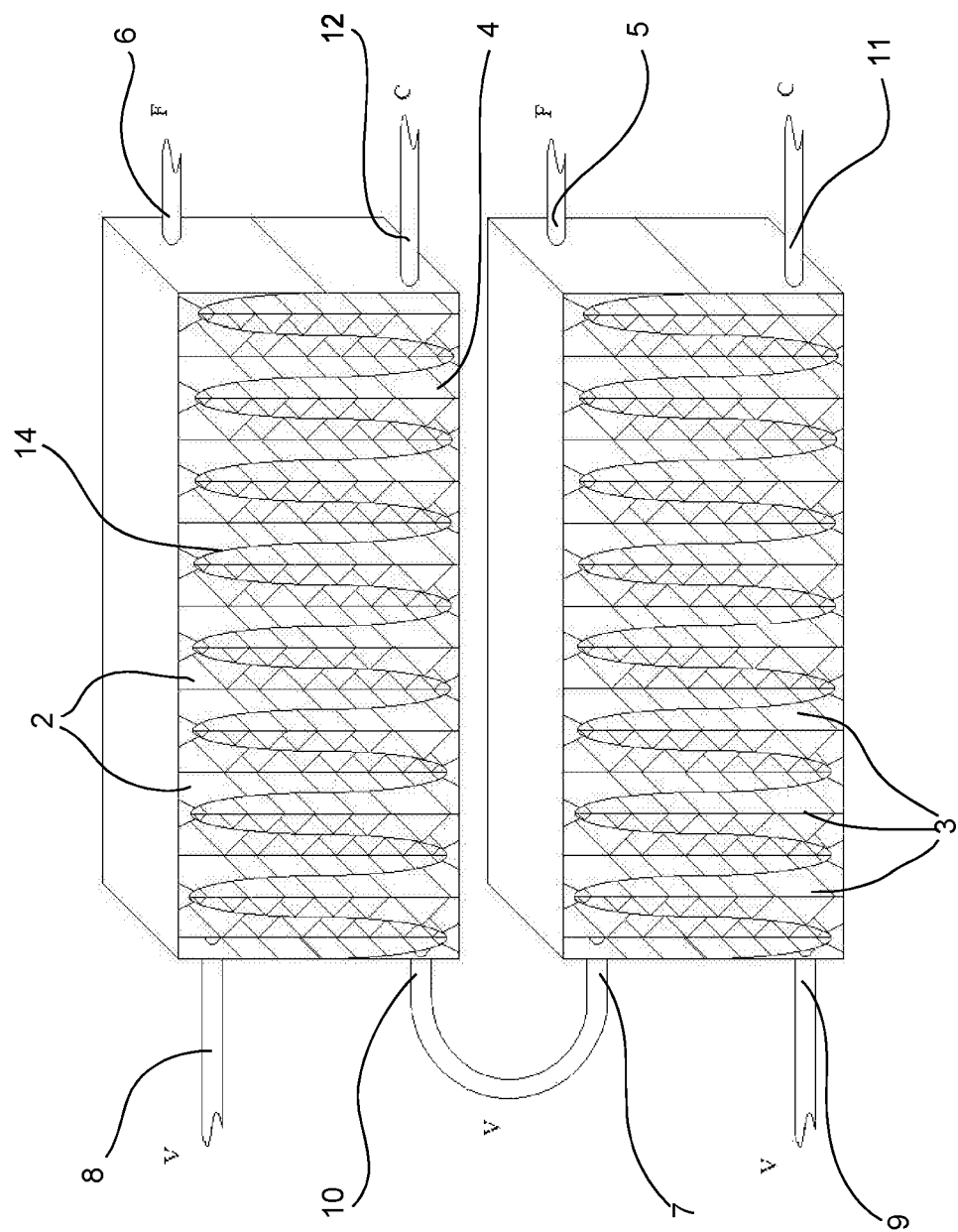
Figure 4A:
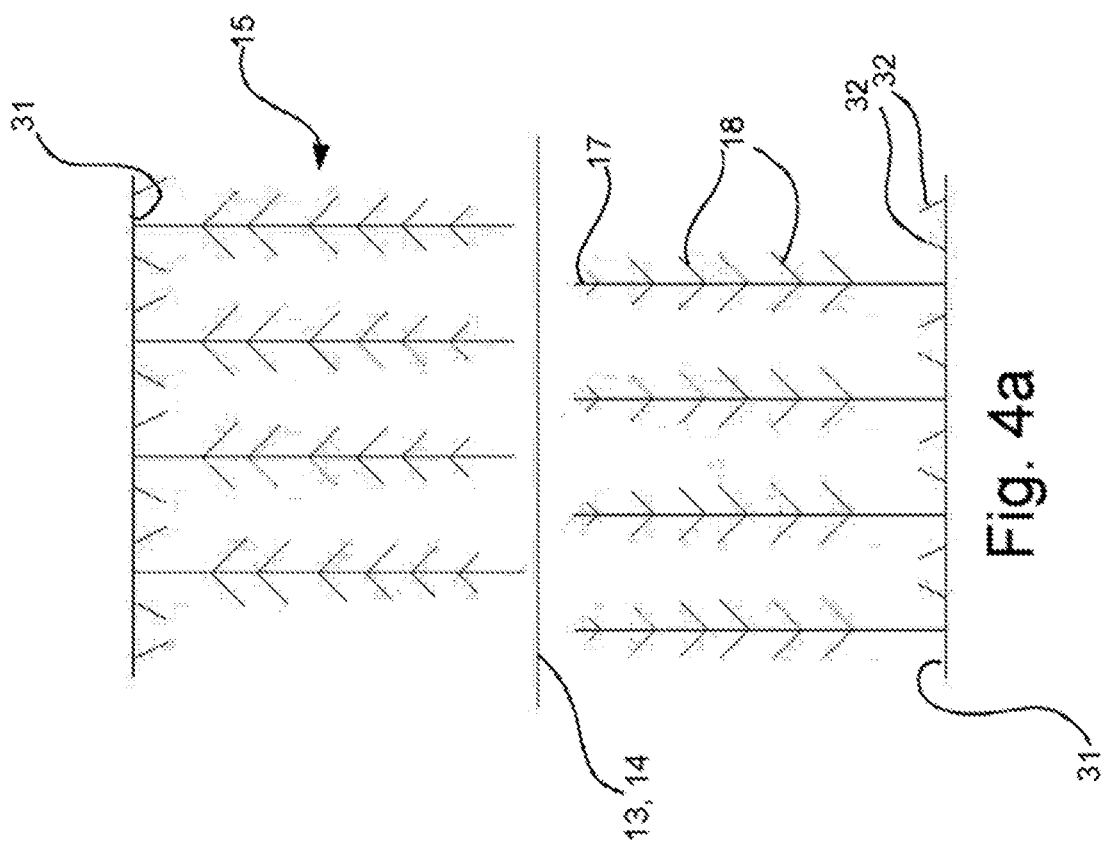
Figure 4B:
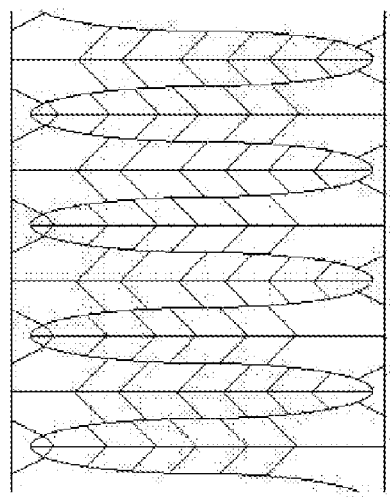
Figure 5:
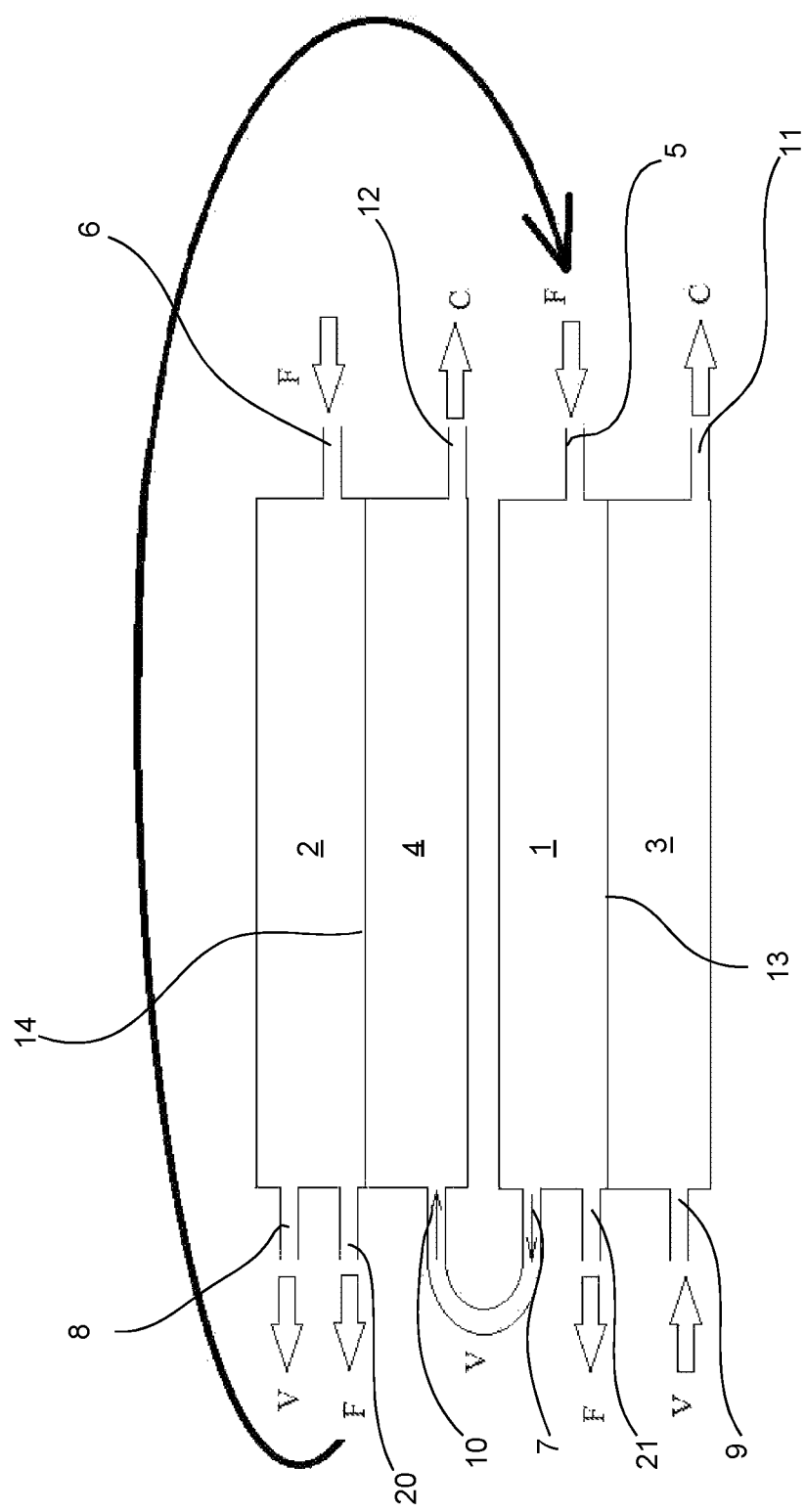
Figure 6:
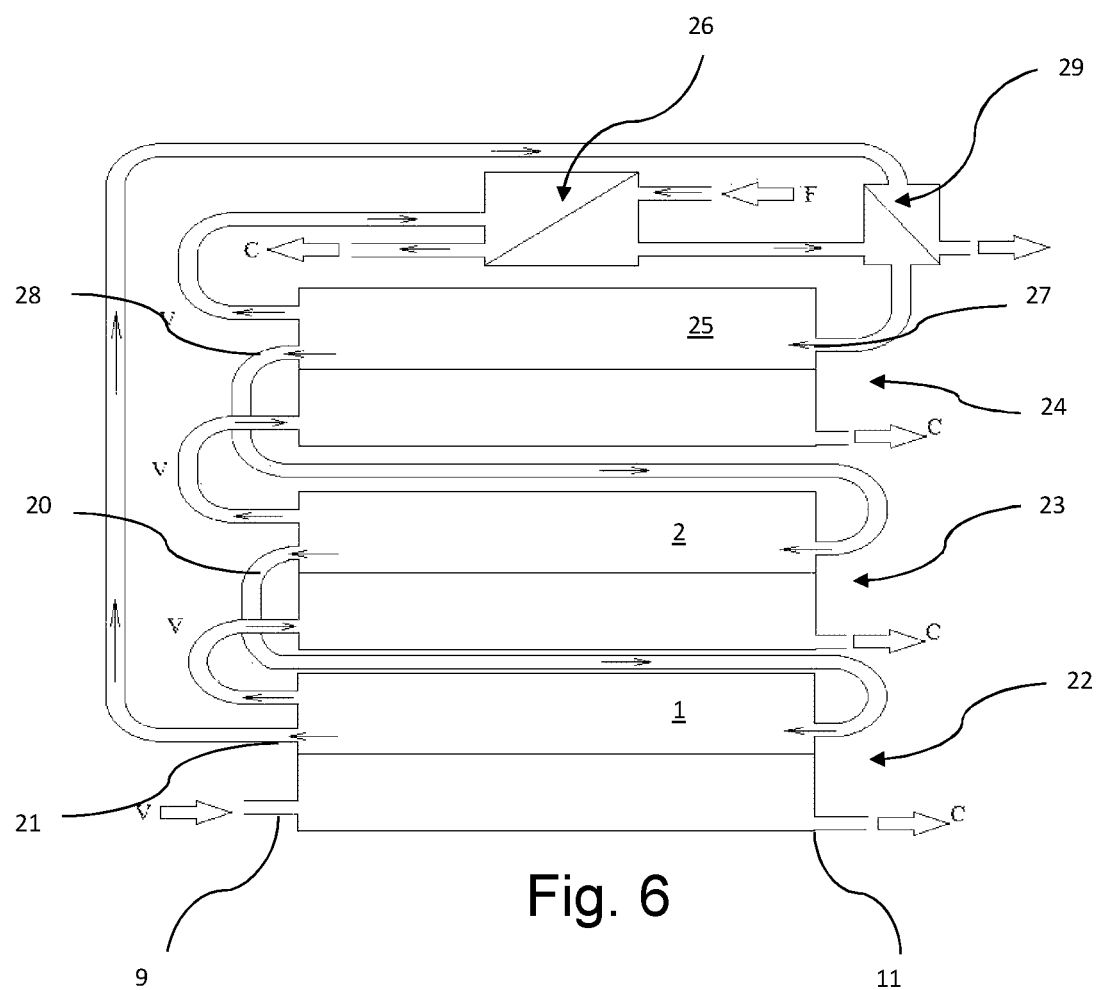
Figure 8:
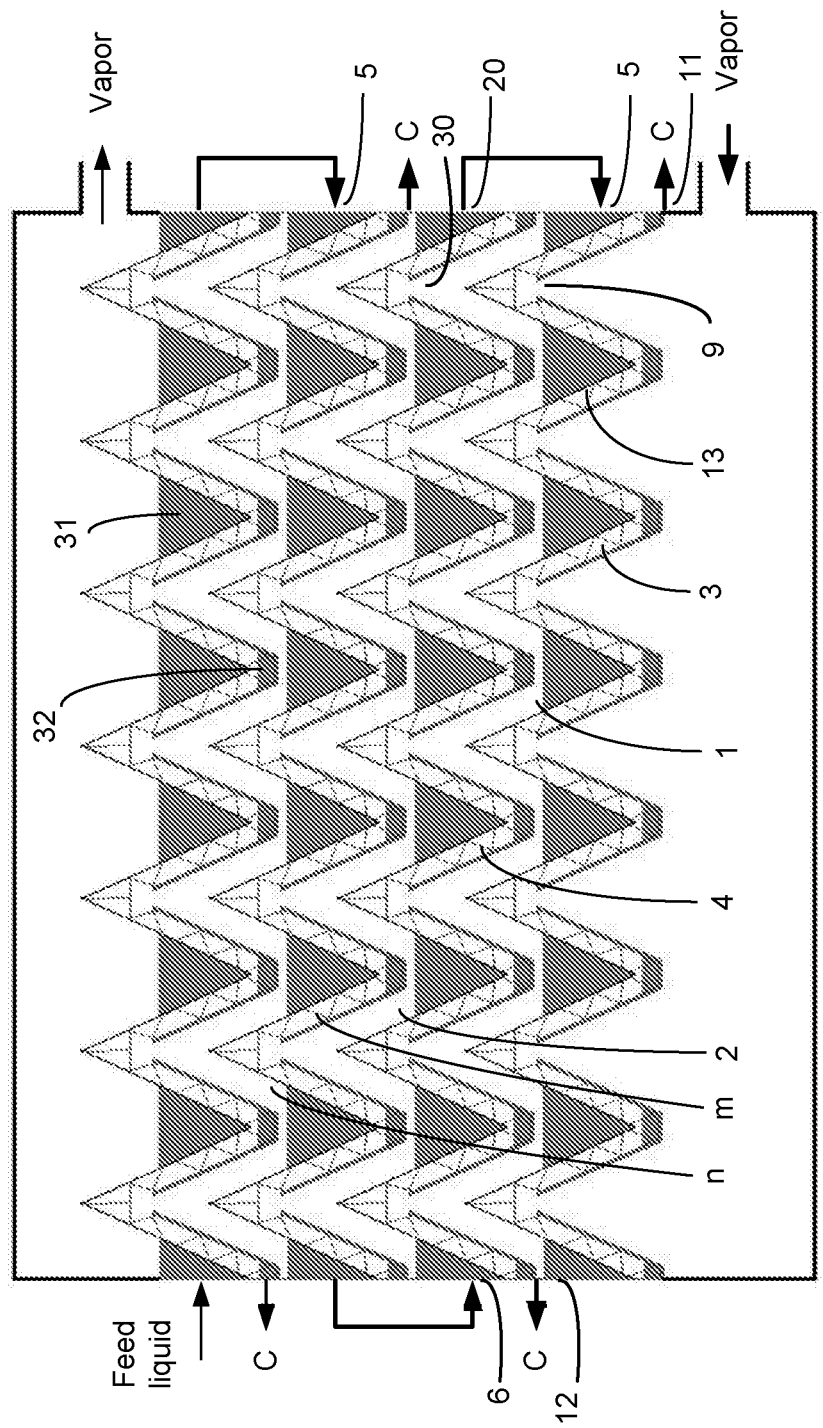

In the following, exemplary embodiments of the device and the method according to the present disclosure will be described with reference to the drawings in which:

FIG. 1 shows a drawing of one embodiment.
FIG. 2 shows an embodiment with supporting members,
FIG. 3 shows an embodiment in which a part of the condensation section is complementary to a part of the evaporation section and the membrane is interfaced between the sections.
FIGS. 4a and 4b disclose the supporting elements and the membrane before and after assembly.
FIG. 5 discloses an embodiment according to which the feed water is reused in a subsequent step.
FIG. 6 shows an embodiment using three modules.
FIG. 7a shows an embodiment according to which the feed is supplied to the inlet of each of the modules and FIG. 7b shows that the feed moves in counter-current with the vapor from one module to the next.
FIG. 8 shows an embodiment in which the condensing and evaporating sections have been alternately layered.

DETAILED DESCRIPTION OF THE DRAWINGS

FIG. 1 shows an embodiment of the present disclosure in which a feed liquid, such as sea water polluted water from a river or industry, is distilled in a two-effect distillation system.

The distillation system comprises a first and second evaporation section 1 and 2 and a first and second condensation section 3 and 4. Each of the evaporation sections comprises a liquid inlet 5 and 6 and a vapor outlet 7 and 8 and each of the condensation sections comprises a vapor inlet 9 and 10 and a liquid outlet 11 and 12.

The first evaporation section 1 and the second condensation section 4 is in vapor connection through the first evaporation section outlet 7 and the second condensation section inlet 10. Furthermore, the first evaporation section 1 is in thermal contact with the first condensation section 3 and the second evaporation section 2 is in thermal contact with the second condensation section 4. The evaporation and condensation sections in thermal contact are separated by a non-permeable polymer membrane 13 and 14.

When a feed liquid is supplied through the liquid inlet 5 and 6 to the first and second evaporation sections 1 and 2, respectively, evaporation is started by supply of heat from the first and second condensing sections 3 and 4. The first condensation section 3 is supplied with vapor through the vapor inlet 9 to evaporate the feed liquid of the first evaporation section 1. The condensation of the vapor in the first condensation section 3 produces a distillate product in the first condensation section, and a vapor in the first evaporation section 1. The vapor is transferred through the first evaporation section vapor outlet 7 to the second condensation section vapor inlet 10. The transferred vapor is allowed to condensate in the second condensation section 4 to produce a distillate product, and evaporate the feed liquid provided in the second evaporation section 2. The distillate product is drained from the first condensation section 3 and the second condensation section 4 through the respective outlets 11 and 12.

When the vapor entered at inlet 9 and 10 is condensed to water, the pressure of the remaining vapor will decrease. The decreased pressure will provide for a pressure below ambient pressure above the surface of the feed liquid, which in turn will reduce the boiling temperature of the feed liquid. Furthermore, the reduced pressure will provide a suction effect which will drive the transfer of the vapor produced in the first evaporation section 1 to the second condensing section 4.

Due to the decreased pressure generated by the condensation, the condensation section does not usually comprise a vapor outlet, i.e. the entire amount of vapor entering the condensation section is condensed to the distillate product.

FIG. 2 shows an embodiment with supporting elements 15. The supporting elements extends from the bottom of the respective sections to above the level of the non-permeable polymer membrane, thereby bending or stretching the polymer film to obtain a larger surface area. The larger surface area provides an improved heat exchange and thus improved condensation.

FIG. 3 shows an embodiment of the inventions in which supporting elements are used to keep the membrane in place between complementary evaporation and condensing sections. Details of the assembly are shown in FIGS. 4a and 4b. As shown in FIG. 4a elongated support elements are extending from the surface 31 of the respective sections. In the present embodiment, the supporting elements comprises a stem 17 with branches 18 attached thereto. A plurality of supporting elements 15 are dispersed on the surface 31 of the inner surface of the evaporation and condensation sections. The supporting elements of the evaporation section and the condensation section are positioned so that they are complementary in the sense that a supporting element on e.g. the condensation section is positioned between two supporting elements 32 on the evaporation section. When a polymer membrane is positioned between the evaporation and the condensation section as shown in FIG. 4a and the sections are assembled as shown in FIG. 4b, the polymer membrane is securely placed between the two sections. Furthermore, an evaporation section and a condensation section is formed with clear boundaries which do not allow essential diffusion of liquid or vapor to either the other section or the ambient.

In FIG. 3 two modules of the assembly shown in FIG. 4b are connected, i.e. the outlet from the first evaporation section 7 is connected to the vapor inlet of the second condensation section 10. The feed vapor entering at inlet 9 to the condensation section may be entered at a single inlet to the condensation section or be distributed over part of the entire surface of the condensation section. In the embodiment shown the polymer membrane is shaped in tops and valleys which form channels. According to a preferred aspect the feed vapor is entered at several locations to obtain a more even distribution and to allow the feed vapor to travel along the formed channels. The feed liquid may be entered from the other side in the complementary channels, thereby allowing a counter-current exchange of energy, which will improve the efficiency of the condensation.

FIG. 5 shows an embodiment in which the feed liquid evaporated one or more times is transferred from the liquid outlet 20 of the evaporation section 2 to a liquid inlet 5 of a subsequent evaporation section 1, and possibly further through liquid outlet 21 of the evaporation section 1. In this way, the heat stored in the feed liquid is maintained in the system. Furthermore, impurities in the feed liquid are concentrated. If the feed liquid is sea water, the salt concentration increases after each evaporation event. Eventually, the concentrated brine may be used for recovering the salt crystals. Using the technology of FIG. 5 will allow the vapor transported from the first evaporation section to the second condensation section to be heat exchanged counter-currently with the feed liquid.

FIG. 6 depicts three modules 22, 23, 24 arranged in series. The temperature is normally highest in the module closest to the vapor feed (V) and becomes successively colder for each subsequent module. When feed liquid (F) is moving in counter-current, the liquid feed becomes heated in each step towards the module closest to the vapor feed. The module 22 with the vapor feed inlet 9, is connected through the liquid outlet 21 to a heat exchange element 29. The feed liquid source (not shown) provides feed liquid (F) to the condenser 26, from where it passes through the heat exchanger 29 for further heating, wherefrom it passes through the liquid feed inlet 27 of the final evaporation section 25. A portion of the liquid feed passes through the evaporation section 25, without evaporating, and is transferred through the liquid outlet 28 of the evaporation section 25, to the liquid feed inlet 6 of the second evaporation section. The vapor produced in the final evaporation section 25 is condensed in condenser element 26 in heat exchange with the feed liquid.

In a computer simulated arrangement 12 modules as shown in FIG. 3 was arranged in series and initially provided with a stream of steam provided by allow the sun to evaporate water. The steam is provided at 80° C. at a pressure of 0.474 bar. The steam is transferred to the first condensing section and due to the pressure drop in the pipes at the fittings, it is expected that the condensation will happen at 78° C. and a pressure of 0.437 bar. The condensation on the membrane provides for the liberation of heat energy, which will provide for a "cooking" in the first evaporation section at 74° C. and a pressure of 0.370 bar. Due to loss in the heat transmission over the membrane it is expected that the "cooking" temperature of the first evaporation section will be about 4° C. lower than in the first condensation section. The repeated evaporation and condensation in consecutive steps is continued for all 12 modules with an estimated loss of temperature of 4° C. in each step. In the last step, the steam generated from the twelfth evaporation section is condensed in a heat exchanger by using surface sea water having a temperature of 20° C. The condensation is estimated to occur at 34° C. and a pressure of 0.035 bar in the heat exchanger, and the surface seawater is expected to be heated from 20° C. to 31° C. The seawater heated by the heat exchanger may be as the feed liquid for the 12th module.

FIG. 7 shows another embodiment of the present distillation system. In FIG. 7a the same feed liquid is distributed to each of the modules through distribution pipes 19. In an alternative embodiment shown in FIG. 7b the liquid feed is supplied to the module most distant relative to the vapor source. The liquid feed is then transferred to subsequent modules closer to the feed vapor, thereby accumulating the heat energy and also concentrating the impurities, if present. The feed liquid obtained in the module closest to the feed vapor may be heat exchanged with the feed liquid entering the system.

FIG. 8 shows an embodiment of the present disclosure in which a feed liquid, such as sea water or polluted water households or industry, is distilled in a multi-effect distillation system.

The distillation system comprises a first, second, and further evaporation sections 1, 2, and n, and a first, second, and further condensation sections 3, 4, and m. Each of the evaporation sections comprises a liquid inlet 5 and 6 and a vapor opening 9 delivering the vapor to the condensation section and each of the condensation sections comprises a liquid outlet 11 and 12.

The first evaporation section 1 and the second condensation section 4 is in vapor connection through the opening 30, i.e. the first evaporation section outlet and the second condensation section inlet are combined. The opening 30 may be a single hole, a plurality of holes or a horizontal channel for allowing the vapor to migrate from the evaporation section to the condensation section. Furthermore, the first evaporation section 1 is in thermal contact with the first condensation section 3 and the second evaporation section 2 is in thermal contact with the second condensation section 4. The evaporation and condensation sections in thermal contact are separated by a non-permeable membrane 13 and 14.

When a feed liquid is supplied through the liquid inlet to the first, second, or further evaporation sections 1, 2, and n evaporation is started by supply of heat from the first, second, or further condensing sections 3, 4, or m. The first condensation section 3 is supplied with vapor through the vapor inlet 9 to evaporate the feed liquid of the first evaporation section 1. The condensation of the vapor in the first condensation section 3 produces a distillate product in the first condensation section, and a vapor in the first evaporation section 1. The vapor is transferred through the opening 30 to the second condensation section. The transferred vapor is allowed to condensate in the second condensation section 4 to produce a distillate product, and evaporate the feed liquid provided in the second evaporation section 2. The distillate product is drained from the first condensation section 3 and the second condensation section 4 through the respective outlets 11 and 12. The same principle applies for the any further evaporation sections n, and any further condensation sections m.

In each evaporation section elongational feed liquid grooves 31 are present. A feed liquid groove may at the end be liquidly connected to another, such as a neighboring, groove to establish a flow system between grooves. Thus, a plurality of grooves may be connected in a meandering way by serially connecting each of the grooves to provide for a flow system of feed liquid from the inlet to the outlet of an evaporation section. Alternatively, the feed liquid may be supplied to the end of two or more grooves simultaneously through a manifold or similar element to provide for a parallel flow. In the downstream direction of the grooves in an evaporation section an outlet is present. The outlet supplies the one or more times evaporated feed liquid to an inlet of a subsequent evaporation section. Thus, the outlet of the second (or $n^{th}$) evaporation section supplies feed liquid to the inlet of the first (or $(n-1)^{th}$) evaporation section. Similarly, the condensate grooves 32 may be connected. Thus, a condensate groove may at the end be liquidly connected to another, such as a neighboring, groove to establish a flow system between grooves. Thus, a plurality of grooves may be connected in a meandering way by serially connecting each of the grooves to provide for a flow system of condensate liquid to the outlet of a condensation section. Alternatively, the condensate liquid may be collected from the end of two or more grooves simultaneously through a manifold or similar element to provide for a parallel flow. In the downstream direction of the grooves in a condensation section an outlet is present. To preserve the energy in the condensate stream it may be advantageous to connect the outlet of a condensation section with the inlet of a subsequent condensation section. Thus, the condensate outlet of a first (or $n^{th}$) condensation section may be fluidly connected to the inlet of a second (or $(n+1)^{th}$) condensation section.

When the vapor entered at inlet 9 and opening 30 is condensed to water, the pressure of the remaining vapor will decrease. The decreased pressure will provide for a pressure below ambient pressure above the surface of the feed liquid, which in turn will reduce the boiling temperature of the feed liquid.

Furthermore, the reduced pressure will provide a suction effect which will drive the transfer of the vapor produced in the first or subsequent evaporation section to the second or subsequent condensing section.

The vapor generated in the last stage may be condensed in a condenser cooled by an available natural or industrial source. As an example, the last stage vapor may be condensed by heat exchange with ground water generally having a temperature of around 6-8 degrees Celsius throughout the year. Alternatively, sea water or air may be used to condense the vapor.

In FIG. 8 the feed liquid evaporated one or more times is transferred from the liquid outlet 20 of the evaporation section 2 to a liquid inlet 5 of a subsequent evaporation section 1. In this way, the heat stored in the feed liquid is maintained in the system. Furthermore, impurities in the feed liquid are concentrated. If the feed liquid is sea water, the salt concentration increases after each evaporation event. Eventually, the concentrated brine may be used for recovering the salt crystals. Using the technology of FIG. 8 will allow the vapor transported from an evaporation section to a condensation section to be heat exchanged counter-currently with the feed liquid.

The invention claimed is:

1. A device for purifying liquids by distillation, the device comprising
    a first evaporation section and a second evaporation section, and
    a first condensation section and a second condensation section,
    each evaporation section comprising a liquid inlet and a vapor outlet and each condensation section comprising a vapor inlet and a liquid outlet,
    the first evaporation section and the second condensation section being in vapor connection through the first evaporation section vapor outlet and the second condensation section vapor inlet,
    wherein the first evaporation section is in thermal contact with the first condensation section, and the second evaporation section is in thermal contact with the second condensation section,
    wherein the sections in thermal contact are separated by a non-permeable membrane,
    wherein the shape of the non-permeable membrane defines one or more elongated grooves comprising a plurality of grooves that are fluidly connected to provide for a flow system of feed liquid from the liquid inlet to the liquid outlet of each evaporation section, and
    wherein the second evaporation section comprises a liquid outlet which is configured to deliver a fluid to the liquid inlet of the first evaporation section.

2. The device according to claim 1, wherein the non-permeable membrane is a polymer membrane.

3. The device according to claim 2, wherein the non-permeable polymer membrane is supported by supporting members.

4. The device according to claim 1, wherein the non-permeable membrane is provided in a shape, the shape providing a surface area of the membrane being at least twice the size of a non-bending plane membrane.

5. The device according to claim 1, wherein a face of the first evaporation section and a face of the second condensation section are separated by a thermally isolating element or air.

6. The device according to claim 1, wherein at least a part of the first evaporation section and at least a part of the second evaporation section are complementary to at least a part of the first condensation section and at least a part of the second condensation section, respectively, and wherein the complementary parts of the first evaporation section and the second evaporation section and the first condensation section and the second condensation section are interfaced by the membrane.

7. The device according to claim 1, wherein the plurality of grooves forms two or more grooves in the first evaporation section or the second evaporation section that are liquidly connected to each other to establish a flow system between the grooves.

8. The device according to claim 1, wherein, a feed liquid is supplied to ends of two or more grooves of the plurality of grooves through a manifold to provide for a parallel flow of the feed liquid.

9. A device for purifying liquids by distillation, the device comprising
  a first evaporation section and a second evaporation section, and
  a first condensation section and a second condensation section,
  each evaporation section comprising a liquid inlet and a vapor outlet and each condensation section comprising a vapor inlet and a liquid outlet,
  the first evaporation section and the second condensation section being in vapor connection through the first evaporation section vapor outlet and the second condensation section vapor inlet,
  wherein the first evaporation section is in thermal contact with the first condensation section, and the second evaporation section is in thermal contact with the second condensation section,
  wherein the sections in thermal contact are separated by a non-permeable membrane, and
  wherein the vapor outlet of an evaporation section and the vapor inlet of a condensation section are combined into an opening allowing vapor to migrate from the evaporation section to the condensation section, and
  wherein the second evaporation section comprises a liquid outlet which is configured to deliver a fluid to the liquid inlet of the first evaporation section.

10. The device according to claim 9, wherein the opening is a single hole, a plurality of holes or an elongated channel allowing the vapor to migrate from the evaporation section to the condensation section.

11. The device according to claim 10, wherein two or more grooves in a condensation section are liquidly connected to each other to establish a flow system between the grooves.

12. A device for purifying liquids by distillation, the device comprising
  a first evaporation section and a second evaporation section, and
  a first condensation section and a second condensation section,
  each evaporation section comprising a liquid inlet and a vapor outlet and each condensation section comprising a vapor inlet and a liquid outlet,
  the first evaporation section and the second condensation section being in vapor connection through the first evaporation section vapor outlet and the second condensation section vapor inlet,
  wherein the first evaporation section is in thermal contact with the first condensation section, and the second evaporation section is in thermal contact with the second condensation section,
  wherein the sections in thermal contact are separated by a non-permeable membrane,
  wherein a pairing of one of the first evaporation section and the second evaporation section and its respective condensation section with which it is in thermal contact constitutes a module, wherein the second evaporation section further comprises a liquid outlet,
  wherein two modules are connected so that the vapor outlet of the first evaporation section in a first module is connected to the vapor inlet of a second condensing section in a second module and the liquid outlet of the second evaporation section of the second module is configured to deliver a fluid to the liquid inlet of the first evaporation section in the first module, and
  wherein the vapor outlet of the first evaporation section of the first module is combined with the vapor inlet of the second condensing section of the second module into an opening allowing vapor to migrate from the first evaporation section to the second condensation section.

13. The device according to claim 12, further comprising a terminal module that is adapted for receiving a feed liquid through an evaporation section liquid inlet of the terminal module, thus providing for the feed liquid in counter-flow with a feed vapor.

14. The device according to claim 12, wherein the non-permeable membrane separating the evaporation section and the condensation section of the module is a polymer membrane.

15. A method of producing a distillate product from a feed liquid, by use of a device according to claim 1, the method comprising:
  a) Supplying a feed liquid through the liquid inlet of the first evaporation section and the liquid inlet of the second evaporation section,
  b) Supplying a vapor to the first condensation section through the vapor inlet of the first condensation section to evaporate the feed liquid of the first evaporation section in step a), and to condense the vapor in the first condensation section, to produce a first distillate product in the first condensation section, and a produced vapor in the first evaporation section,
  c) Transferring the vapor in the first evaporation section obtained in step b) through the first evaporation section vapor outlet to the second condensation section vapor inlet,
  d) Allowing condensation of the transferred vapor in the second condensation section to produce a second distillate product in the second condensation section, and allowing evaporation of the feed liquid provided in the second evaporation section in step a),
  e) Draining the first distillate product from the first condensation section and the second distillate product from the second condensation section through the respective condensation liquid outlets of each.

16. The method according to claim 15, wherein the temperature of the vapor supplied to the first condensation section in step b) is higher than the temperature of the vapor produced in the first evaporation section.

17. The method according to claim 16, wherein the temperature difference between the vapor supplied to the first condensation section and the vapor produced in the first evaporation section is 1° C. or more.

18. The method according to claim 16, wherein the temperature difference between the vapor supplied to the first condensation section and the vapor produced in the first evaporation section is 10° C. or less.

19. The method according to claim 15, wherein the feed liquid entering the first evaporation section or the second evaporation section is preheated by heat exchange with spent feed liquid evaporated one or more times.

* * * * *